United States Patent
Baxter, Jr.

[15] 3,669,408
[45] June 13, 1972

[54] METAL TO METAL SEA FOR EXTREME TEMPERATURE APPLICATIONS

[72] Inventor: David W. Baxter, Jr., Sylmar, Calif.
[73] Assignee: Textron Inc.
[22] Filed: Jan. 14, 1970
[21] Appl. No.: 2,814

[52] U.S. Cl. ................................................251/359
[51] Int. Cl. ...............................F16k 51/00, F16k 1/226
[58] Field of Search...................251/359, 362, 334, 333, 365

[56] References Cited

UNITED STATES PATENTS

| 1,720,486 | 7/1929 | Leipert | 251/359 X |
| 1,795,433 | 3/1931 | Leipert | 251/359 X |
| 3,022,978 | 2/1962 | Kowalski et al. | 251/363 X |
| 3,107,895 | 10/1963 | Vogeli | 251/359 |
| 3,127,905 | 4/1964 | Vogeli | 251/359 X |
| 3,164,364 | 1/1965 | McColl | 251/334 |
| 3,412,975 | 11/1968 | Kurkjian, Jr. | 251/362 |
| 3,458,170 | 7/1969 | Vegeli | 251/359 X |
| 3,471,123 | 10/1969 | Carlson et al. | 251/362 |
| 3,487,823 | 1/1970 | Tarter et al. | 251/359 X |

Primary Examiner—Samuel Scott
Attorney—Nilsson, Robbins, Wills and Berliner

[57] ABSTRACT

Disclosed is an electromagnetically operated force motor which positions a valve member with respect to a valve seat to open and close a valve, thereby controlling the flow of fluid through a chamber which is sealed with respect to the force motor. The valve seat is maintained in position by a mechanical bond which provides a fluid-tight seal under extreme temperature conditions, for example, cryogenic applications.

9 Claims, 5 Drawing Figures

PATENTED JUN 13 1972  3,669,408
FIG. 1.
FIG. 3.
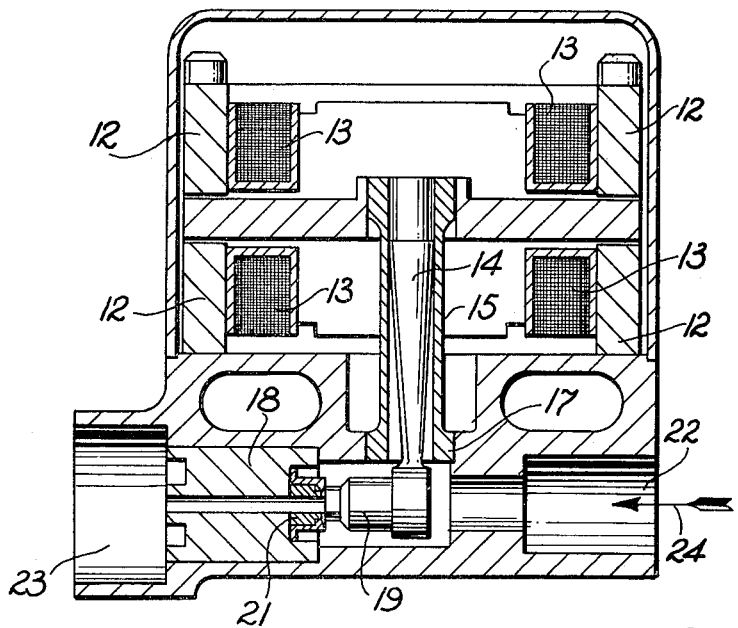
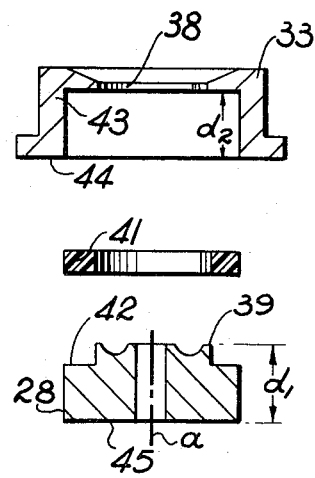
FIG. 2.
FIG. 5.
FIG. 4.
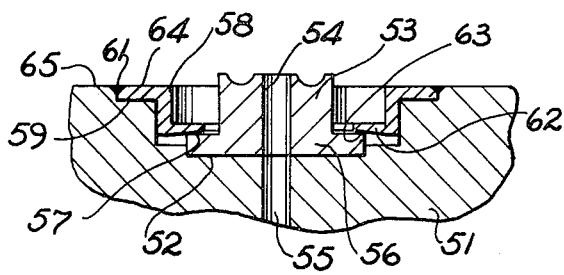
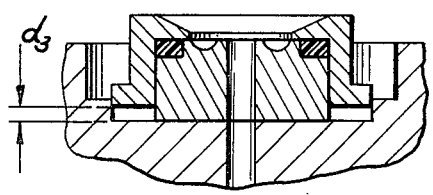
INVENTOR.
DAVID W. BAXTER, JR.
BY
Nilsson & Robbins
Attorneys.

3,669,408

METAL TO METAL SEA FOR EXTREME TEMPERATURE APPLICATIONS

BACKGROUND OF THE INVENTION

In controlling the flow of certain very corrosive and toxic fluids, such for example as hydrazine, it is necessary to provide valves having zero leakage throughout, including the valve seat and valve. To obtain the required finishes so as to meet the leakage specification, cemented carbide metals are used for seats and poppets. Typically, such seats and poppets are brazed in place. However, such corrosive fluids attacked and destroyed the brazing metal normally utilized. Electron beam welding was attempted and could not be used because of the great difference in melting temperature between the cemented carbides and the valve body material and the discovery that the carbides were caused to crack by the high temperatures involved in the electron beam welding. Therefore, the normal metal processing techniques generally employed are not available. A technique of swaging a metallic material into grooves formed in the apparatus, as disclosed in U.S. application, Ser. No. 776,928, filed Nov. 19, 1968 now U.S. Pat. No. 3,559,946 and assigned to the assignee of the present application has proven successful in overcoming the prior problems except in those applications where extreme temperature conditions persist, such as in cryogenic or very high temperatures. Under such ambient temperature conditions, or cycling between room temperature and such ambients, it has been found that the swaged metal seals tend to leak.

SUMMARY OF THE INVENTION

First and second members are positioned upon a base member with the second member being permanently and rigidly affixed to the base. The second member is placed under stress to effectively clamp the first member to the base and provide a metal to metal seal between the first and second members. The first and second members have substantially different coefficients of thermal contraction and expansion thereby to effect greater clamping force by said second member on said first member as ambient temperature changes.

BRIEF DESCRIPTION OF THE DRAWINGS

FIG. 1 illustrates in cross-section a valve structure formed in accordance with the present invention;

FIG. 2 illustrated in cross-section, the valve seat portion of the valve illustrated in FIG. 1;

FIGS. 3 and 4 illustrate the valve structure shown in FIG. 2 in intermediate stages of construction; and FIG. 5 illustrates an alternative embodiment.

DETAILED DESCRIPTION

Referring now to FIG. 1, there is generally illustrated in an elevational view in cross-section an electromagnetically operated force motor for operating a poppet valve utilized for the control of highly corrosive fluids such as those above referred to. Such a valve includes an armature 11 positioned between pole pieces 12 which are actuated by coils 13 to which an electrical signal is applied from a source thereof (not shown). A flapper 14 is sealed to a flexure tube 15 at the upper end thereof and the flexure tube is in turn sealed at its upper end 16 to the armature. The lower end 17 of the flexure tube is sealed to the body 18 of the valve thereby causing the flexure tube to accomplish the functions of sealing the force motor from the remainder of the valve and also physically supporting the flapper 14. Affixed to the lower end of the flapper 14 is a poppet 19 which cooperates with a valve seat 21 to control the flow of fluid from a source thereof (not shown) through the valve into an input port 22 and out through the output port 23 in the direction as shown by the arrow 24. A valve of the type generally illustrated in FIG. 1, and briefly described above, is well known in the prior art, as illustrated, for example, by U.S. Pat. No. 3,373,769 and, therefore, detailed description will not be made thereof at the present time. As is discussed in U.S. Pat. No. 3,373,769, such a valve is capable of and is specifically designed for handling highly corrosive fluids of the type above referred to either in the form of single or dual poppet valves.

Although the present invention relates generally to such valves, it is specifically directed to the mechanical retention which is employed in the construction thereof, such, for example, as retaining the valve seat 21 on the valve body while the valve is subjected to extreme temperature ambients. The construction of the seat 21 is more clearly illustrated in FIG. 2 to which reference is hereby made.

As is illustrated in FIG. 2, the body 18 of the valve defines a recess 26 therein the bottom of which forms a base 27 upon which a first member in the form, for example, of a valve seat body rests. The seat body defines an orifice 29 therethrough which is aligned with an opening 31 formed through the valve body 18. The valve seat body also defines a valve seat 32 in the form of a metal surface upon which the poppet 19 seats in order to control the flow of fluid through the valve as above described. After the seat body 28 is thusly positioned in place, it is retained in place mechanically (as opposed to being welded or bolted) by a retainer member 33. The retainer member 33 has an outwardly extending anchoring surface such as a flange 34 which fits within the recess 26 and abuts the wall forming the same. The retainer member 33 is held in place within the recess 26 by being permanently affixed to the body 18 such, for example, as by electron beam welding 35 through a continuous opening 36 provided between the retainer 33 and the body of the valve 18. The retainer 33 also includes an inwardly directed flange 37 which defines a continuous surface 38. The continuous surface 38 seats upon and mates with a second continuous surface 39 defined by the seat body 28. As will be more fully described below, the retainer 33 is placed under stress thereby to effect a seal between the continuous surfaces 38 and 39 of a metal to metal type and also to retain the seat body 28 in place upon the base 27. As is also illustrated in FIG. 2, a redundant seal is provided by a Teflon washer 41 which is received within a peripheral recess 42 formed within the seat body 28. Teflon is a registered trademark of Dupont for polytetrafluoroethylene.

The construction of the valve seat shown in FIG. 2 is more clearly illustrated in FIGS. 3 and 4 to which reference is hereby made. As is shown in FIG. 3, the retainer member 33 includes a wall 43 having an internal effective dimension $d_2$ when taken in the direction of the axis a of the orifice 29 formed through the seat body 28. The seat body 28 has a dimension $d_1$ also taken along the direction of the axis a. A dimension of the wall 43, as can be seen, is taken from the continuous surface 38 thereof to the bottom surface 44 while the dimension $d_1$ is taken from the continuous surface 39 to the bottom surface 45 thereof. Thus, it will be noted by reference to FIG. 2 that the bottom surfaces 44 and 45 are aligned when the seat is fully constructed and in place upon the valve body 18. However, the dimensions $d_1$ and $d_2$ are chosen in such a manner that $d_1$ is greater than $d_2$ by some predetermined amount so that when the surfaces 44 and 45 are brought into alignment, the flange 37 is stressed thereby applying a pre-load upon the seat body 28. Thus, it can be seen that the distance between the clamping surfacd 38 and the anchoring surface 34 of the retainer member 33 is shorter before the weld 35 is made than thereafter by an amount $d_3$ (FIG. 4) to stress the flange 37.

Thus, in construction the Teflon washer like member 41 would be placed into the periphemal recess 42 after which the seat body 28 would be positioned upon the base 27. The retainer 33 would then be brought into place in the manner illustrated in FIG. 4. Thereafter, the flange 34 would be pressed downwardly so that the bottom surfaces 44 and 45 of the retainer 33 and the seat body 28 would each bear against the base 27 and thereby be in alignment. At this point, the weld 35 would be effected after which the seat would be permanently and rigidly affixed to the valve body 18. As a result of bringing the surfaces 44 and 45 into alignment, the flange 37 would be stressed as is illustrated in FIG. 2, in highly over-emphasized fashion. At the sametime, the Teflon washer like member 41 would be slightly deformed as a result of the stress also as is over-emphasized in illustration for clarity in FIG. 2.

It has been found desirable in most applications to utilize a dimension difference $d_3$ sufficient to accomplish approximately a 1,000 pounds per square inch pre-load upon the continuous surface 39 of the seat body at room temperature. The materials for the seat body 28 and the retainer 33 are chosen so that the coefficients of thermal expansion and contraction are such that as the ambient temperature to which the valve is subjected changes, the load applied by the continuous surface 38 against the continuous surface 39 increases. Thus, if the ambient temperature is to increase, the coefficient of thermal expansion and contraction of the seat 28 must be greater than that of the retainer 33 while if the temperature is to decrease, then the coefficient of thermal contraction and expansion of the retainer 33 must be greater than that of the seat body 28.

As one specific example, assume that the valve is to be utilized in a cryogenic application such that the temperature will approach absolute zero. Under these circumstances, the material from which the seat body 28 would be constructed would be a cemented tungsten carbide which has an exceedingly low coefficient of thermal expansion and contraction. Alternatively, one could utilize a ceramic material such as alumina which also has an extremely small coefficient of thermal expansion and contraction. For the retainer 33 either titanium or Inconel alloy X–750 could be utilized. Inconel is a trademark of International Nickel Company and Inconel alloy X–750 is a nickel-chromium alloy having the following composition:

| Element | Percentage |
|---|---|
| Nickel | 70.0 min |
| Chromium | 14.0–17.0 |
| Iron | 5.0–9.0 |
| Titanium | 2.25–2.75 |
| Aluminum | 0.40–1.00 |
| Columbium | 0.70–1.20 |
| Manganese | 1.0 max |
| Silicon | 0.5 max |
| Sulfur | 0.01 max |
| Copper | 0.5 max |
| Carbon | 0.08 max |

Titanium at −320° F. has a 4 per cent elongation while Inconel alloy X–750 has 19 per cent elongation at −320° F. Such percentage of elongation provides a faster shrinkage rate as the ambient temperature decreases for the retainer than for the seat body so as to effect the desired increase of stress, as above referred to. It has been determined that an effective differential between the shrinkage rates of the retainer and the seat to effect the desired increase in stress as temperature changes is approximately 2 to 1, although such has not been found to be extremely critical.

The cemented tungsten carbide and Inconel alloy X–750 may also be used in high temperature applications for the seat and retainer respectively by arranging the clamping features as illustrated in FIG. 5. The valve body 51 defines a recess 52 into which a seat body 53 is positioned so as to align openings 54 and 55. The seat body 53 includes a radially outwardly extending flange 56 defining a continuous surface 57 thereon. A retainer member 58 is seated within a recess 59 formed in the valve body 51 and is rigidly affixed in place as by welding at 61. The retainer member 58 includes a radially inwardly directed flange 62 defining a continuous surface 63. The continuous surfaces 57 and 63 are urged into a metal to metal seal by proper pre-loading through stressing the retainer member flange 62 during assembly. That is, when the retainer member 58 is fitted in dimension as above outlined such that the surface 64 must be forced downwardly into alignment with surface 65 before welding. Since the coefficient of thermal expansion and contraction of Inconel alloy X–750 is such that the length of the retainer increases as ambient temperatures increase, the force applied by surface 63 against surface 57 increases thereby effecting a better seal.

What is claimed is:

1. In an apparatus for receiving fluid under pressure, a metal to metal joint comprising:

a body member having a base;

a first member having a first coefficient of thermal expansion and contraction positioned to rest on said base, and includes a first continuous surface area;

a second member having a second coefficient of thermal expansion and contraction and having an anchoring surface, including a wall, permanently and rigidly affixed to said body and having clamping means including a second continuous clamping surface area extending from said wall into sealing engagement with said first continuous surface area and securing said first member to said base;

the distance between said clamping surface and said anchoring surface of said second member being different before said second member is affixed to said body than after being affixed so that said clamping surface extends from said wall substantially orthogonally before and obtusely after said second member is affixed to said body, thereby to stress said clamping means and effect the securing of said first member to said base;

said first coefficient of thermal contraction and expansion being different from said second coefficient of thermal, thereby to effect greater clamping force by said second member as ambient temperature changes.

2. Apparatus as defined in claim 1 wherein said wall has a length which is shorter than the thickness of said first member and the coefficient of thermal contraction and expansion of said second member is substantially greater than that of said first member.

3. Apparatus as defined in claim 2 which further includes deformable sealing means disposed between said first member and said clamping means.

4. Apparatus as defined in claim 3 wherein said deformable sealing means is a teflon washer like member and said first member defines a groove for receiving said washer like member.

5. Apparatus as defined in claim 4 wherein said body and said first member define aligned orifices.

6. A valve for controlling the flow of fluid under pressure therethrough comprising:

a metal valve body defining an opening therethrough;

a metal seat member defining an orifice positioned in alignment with said opening;

a metal clamping member surrounding said seat member and including a wall and a radially inwardly directed flange at one end of said wall, extending into continuous metal to metal contact with said seat member and an anchoring surface at the other end of said wall permanently and rigidly connected to said body;

the distance between said contact surface of said flange and said anchoring surface being different before said anchoring surface is affixed to said body than after being affixed so that said flange extends substantially orthogonally from said wall before and obtusely after said clamping member is affixed to said body;

said flange being thereby stressed, not exceeding its elastic limit thereby effecting a seal between said flange and said seat at said continuous contact therebetween.

7. A valve as defined in claim 6 wherein the coefficients of thermal contraction and expansion of said clamping member and said seat member are substantially different thereby to effect a better seal as the ambient temperature of said valve changes.

8. A valve as defined in claim 7 wherein said seat member has a first dimension taken along the axis of said orifice, said clamping member includes a body portion having a second dimension taken along a line parallel to said axis, said second dimension being shorter than said first dimension and the coefficient of thermal expansion and contraction of said clamping member being greater than that of said seat member, thereby effecting a tighter seal when the ambient temperature decreases.

9. A valve as defined in claim 7 wherein said seat member has a first dimension taken along the axis of said orifice, said clamping member includes a body portion having a second dimension taken along a line parallel to said axis, said second dimension being smaller than said first dimension and the coefficient of thermal expansion and contraction of said seat member being greater than that of said clamping member, thereby effecting a tighter seal when the ambient temperature increases.

* * * * *